March 1, 1949. H. R. SEWELL ET AL 2,463,322
AIR DISTRIBUTING UNIT
Filed Sept. 8, 1945 2 Sheets-Sheet 1

Inventors.
Henry R. Sewell and
Robert T. Palmer
by Robert T. Palmer
Attorney.

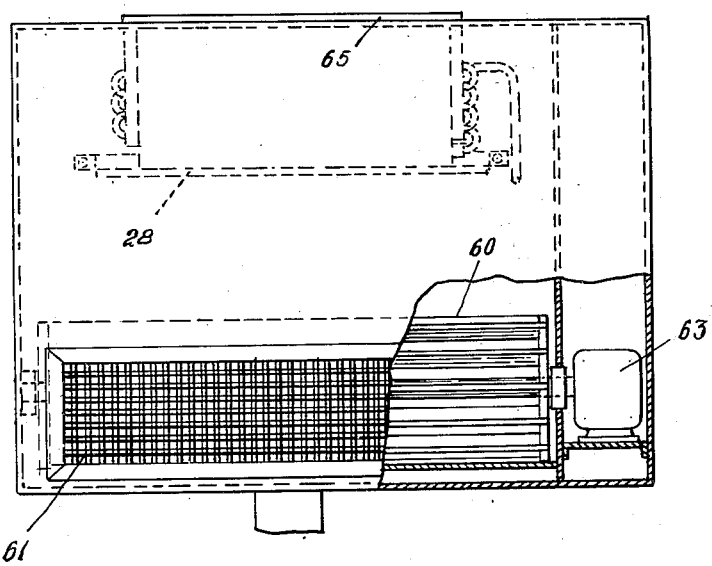
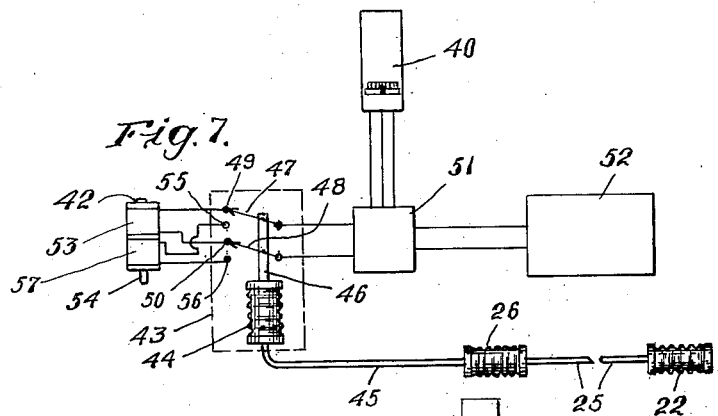
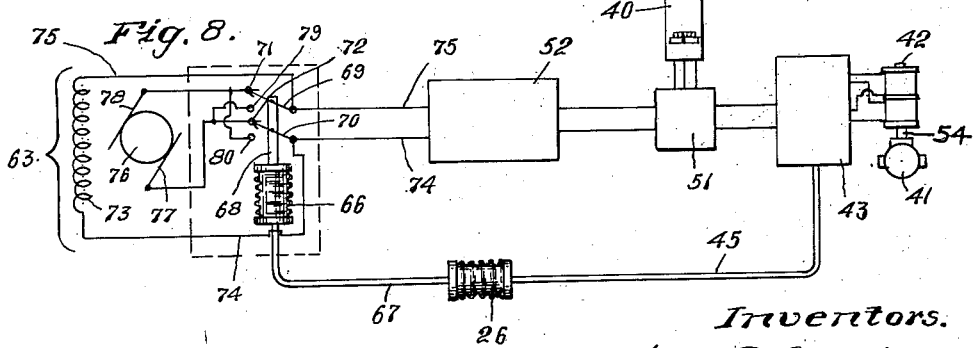

Patented Mar. 1, 1949

2,463,322

UNITED STATES PATENT OFFICE 2,463,322

AIR DISTRIBUTING UNIT

Henry R. Sewell, Norwell, and Robert T. Palmer, Sharon, Mass., assignors, by mesne assignments, to Westinghouse Electric Corporation, a corporation of Pennsylvania Application September 8, 1945, Serial No. 615,193

14 Claims. (Cl. 257—3)

This invention relates to the conditioning of air, and relates more particularly to the automatic control of units in which conditioned air from a central source has its temperature changed to suit local conditions, and which distribute the conditioned air.

Satisfactory results have been obtained in hotels, hospitals, office and other buildings by conditioning outdoor air in a central conditioner and then blowing the conditioned air through small ducts to local distributing units in which the conditioned air has its temperature adjusted to suit local conditions, and discharged into the space served. The Cano Patent No. 1,995,667 discloses such a system.

In a local distributing unit in such a system, a heat exchanger in the unit is supplied with a cooling fluid in summer and with a heating fluid in winter. It is desirable to have a single thermostat control the temperature of the space served by the unit, in both summer and winter, and to be able to adjust the thermostat for maintaining a desired local temperature. An ordinary thermostatically controlled valve will not suffice since in summer the valve must be opened for providing cooling, and in winter it must be closed for providing cooling.

This invention provides for controlling the temperature of the air discharged by such a local distributing unit, with a simple valve controlled by a conventional electrical thermostat located in the space served by the unit.

The Hagen application, Serial No. 581,865, filed March 9, 1945, and the Sewell-Palmer Patent No. 2,442,963, issued June 8, 1948, disclose local air distributing units of the type described in the foregoing, and in which recirculated air is drawn in through the lower portions of the units, and the conditioned air is discharged from the tops of the units, in summer, and the recirculated air is drawn in through the tops of the units, and the conditioned air is discharged from the lower portions of the units, in winter.

This invention provides also for the proper routing of the air through such units automatically when a seasonal control has been actuated to route a cooling fluid or a heating fluid as the case may be, through the units.

An object of the invention is to simplify the thermostatic control of an air distributing unit containing a heat exchanger supplied with a cooling medium in summer and with a heating medium in winter.

Another object of the invention is to reverse the flow of air automatically through a local distributing unit containing a heat exchanger supplied with a heating fluid in winter and with a cooling fluid in summer, whereby recirculated air is drawn in through the top of the unit and conditioned air is discharged from the lower portion of the unit in winter, and recirculated air is drawn in through the lower portion of the unit and conditioned air is discharged from the top of the unit in summer.

The invention will now be described with reference to the drawing, of which:

Fig. 6 is a front elevation with a portion of the front wall removed, of the unit of Fig. 5;

Fig. 7 is a diagrammatic view of the thermostat control system for the unit of Figs. 1–4, and Fig. 8 is a diagrammatic view of the thermostat control system for the unit of Figs. 5 and 6.

Figure 1:
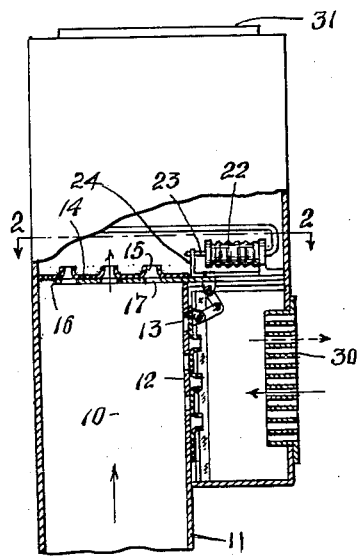
Fig. 1 is a side elevation partially in section, of a local air distributing unit embodying this invention.
Figure 2:
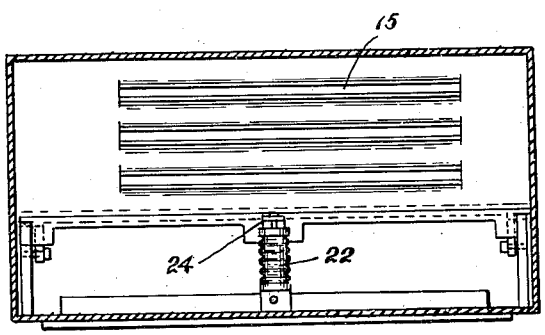
Fig. 2 is a sectional view along the lines 2—2 of Fig. 1.

The unit of Figs. 1–4 has the conditioned air pressure chamber 10 into which conditioned air is supplied through the duct 11 from a central source such as that disclosed in said Cano patent. The chamber 10 has the vertical inner wall 12 having the spaced perforations 13 therein, and has the upper wall 14 with the spaced nozzles 15 formed therein.

The plate 16 with the perforations 17 corresponding in number, spacing and size to the nozzles 15 is slidably supported between the horizontal flanges 18 at the opposite ends of the unit, and contacts the underside of the wall 14.

The plate 19 with the nozzles 20 formed therein, and which correspond in number, size and spacing to the perforations 13 in the wall 12, is slidably supported between the vertical flanges 21 at the opposite ends of the unit, and contacts the outer side of the wall 12.

The bellows 22 positions the plates 16 and 19 and is connected by the tube 25 to the bellows 26 which is in contact with the pipe 27 which supplies heat exchange fluid into the heat exchanger 28. The bellows 22 and 26 and the tube 25 are a conventional hydraulic control such as is manufactured by the Fulton Sylphon Company.

When a seasonal control, which may be manual or automatic, is actuated at the central conditioner or at a zone control point, acts to supply a heating fluid through the pipe 27, the bellows 26 expands and causes the bellows 22 to expand. Conversely when the seasonal control acts to supply a cooling fluid through the pipe 27, the bellows 26 contracts and causes the bellows 22 to contract.

The bellows 22 is connected to the rod 23 which in turn is connected to the extension 24 of the plate 16, and serves to slide the plate 16, when the bellows 22 is expanded, from the position shown by Fig. 1 where the inlets of the nozzles 15 are in alignment with the perforations 17 in the plate 16 to a position where the nozzles 15 and the perforations 17 are out of alignment.

The lugs 35 on the underside of the plate 16 are pivoted to the arms 36 of bell crank levers at the opposite ends of the unit. The arms 37 of the bell crank lever are pivoted to the lugs 38 on the outer side of the plate 19. The bell crank levers are rotatably supported on the shafts 39 which extend inwardly from the ends of the unit.

Figure 3:
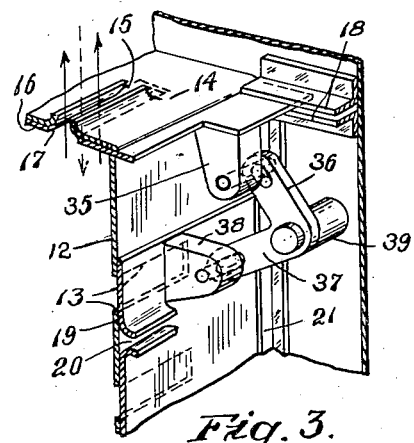
Fig. 3 is an enlarged projected view of the air directing slide mechanism of Figs. 1 and 2.
Figure 4:
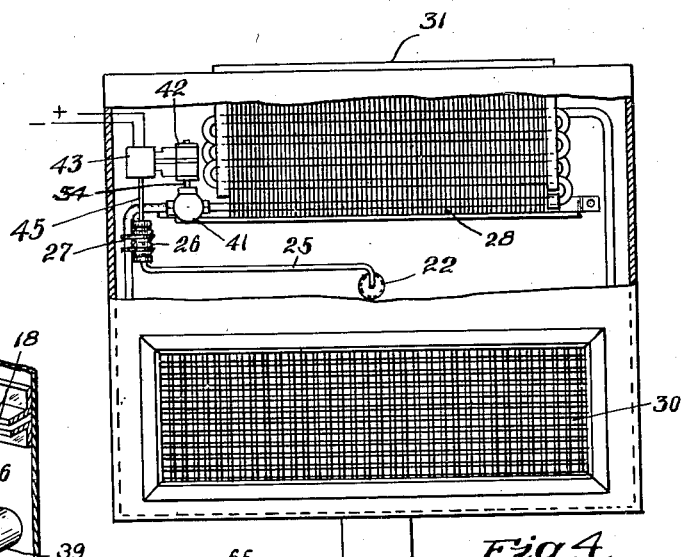
Fig. 4 is a front elevation with a portion of the front wall removed, of the unit.

When the plate 16 is moved by the bellows 22 as previously described, for moving the perforations 17 out of alignment with the nozzles 15, the plate 19 is moved downwardly by the mechanism including the bell crank levers described in the foregoing, from the position shown by Fig. 3 where the nozzles 20 are out of alignment with the perforations 13, to a position where the nozzles 20 and the perforations 13 are in alignment.

Thus when the controls are in the positions shown by Figs. 1 and 3, the upper nozzles 15 and the upper perforations 17 are in alignment, and the side nozzles 20 and the side perforations 13 are out of alignment, and when the bellows 22 is expanded the upper nozzles 15 and the upper perforations 17 are placed out of alignment, and the side nozzles 20 and the side perforations 13 are placed in alignment.

The grille 30 is alongside the nozzles 20, and serves as a recirculated air inlet in the cooling season, and as an air discharge outlet in the heating season as will be described.

The upper grille 31 serves as an air discharge outlet in the cooling season, and as a recirculated air inlet in the heating season as will be described.

In the cooling season when chilled, dehumidified air is supplied through the duct 11 and when a cooling liquid is supplied through the pipe 27 to the heat exchanger 28, the bellows 22 contracts to the position illustrated by Fig. 1 and places the nozzles 15 and the perforations 17 in alignment, and the nozzles 20 and the perforations 13 out of alignment. The conditioned air passes from the chamber 10 through the perforations 17 and the nozzles 15 and induces the flow of recirculated air through the grille 30. The mixed conditioned and recirculated air is discharged through the upper grille 31. The continuous arrows on the drawing illustrate the air flow at this time.

In the heating season when heated, humidified air is supplied through the duct 11 and a heating fluid is supplied through the pipe 27, the bellows 22 expands and moves the nozzles 15 and the perforations 17 out of alignment, and moves the nozzles 20 and the perforations 13 in alignment. The conditioned air then passes from the chamber 10 through the perforations 13 and the nozzles 20 and induces the flow of recirculated air through the upper grille 31. The mixed recirculated and conditioned air is discharged from the lower grille 30. The dash-dot arrows on the drawing illustrate the air flow at this time.

The heat exchanger 28 changes the condition of the air discharged from the unit to suit local requirements and is controlled by the thermostat 40 located in the space served by the unit as will now be described.

The valve 41 actuated by the thermostat 40 through the solenoid 42, controls the admission of heat exchange fluid into the heat exchanger 28. The control box 43 of Fig. 4 contains, as illustrated by Fig. 7, a bellows 44 which is connected by the tube 45 to the previously described bellows 26, and which is connected by the plunger 46 to the electric switch arms 47 and 48.

When heating fluid is supplied through the pipe 27, the bellows 26 causes the bellows 44 to expand and to move the arms 47 and 48 against the contacts 49 and 50 as ilustrated by Fig. 7. This connects the power supply source 52 and the thermostat 40 which preferably is a conventional, low voltage, three wire thermostat, through the conventional relay 51 which contains a voltage reducing transformer which is not illustrated, and the arms 47 and 48 and the contacts 49 and 50 to the winding 53 of the solenoid 42. This winding when energized by the closing of the contacts of the thermostat 40, acts to move the plunger 54 of the valve 41 upwardly for opening the valve for the admission of heating fluid.

When cooling fluid is supplied through the pipe 27, the bellows 26 causes the bellows 44 to contract and to move the arms 47 and 48 away from the contacts 49 and 50 and against the contacts 55 and 56, connecting the thermostat 40 and the power supply 52 to the winding 57 of the solenoid 42. The winding 57 when energized by the closing of the contacts of the thermostat 40 acts to move the plunger 54 of the valve 41 downwardly for closing the valve.

Thus when the thermostat closes its contacts in a call for heat in the heating season, the valve 41 is opened to admit heating fluid into the heat exchanger 28, and when the thermostat closes its contacts in a call for heat (less cooling) in the cooling season, the valve is closed to decrease the volume of cooling fluid supplied into the heat exchanger 28.

Figure 5:
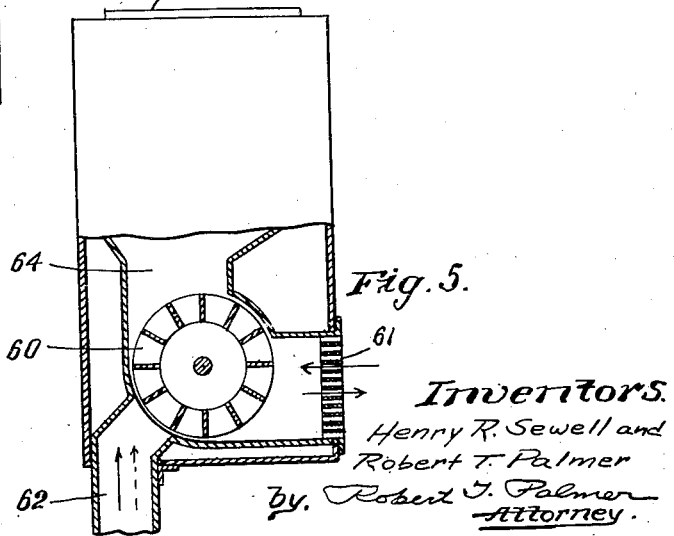
Fig. 5 is a side elevation, partially in section, of another form of distributing unit embodying features of the invention.

In the air distributing unit of Figs. 1–4 described in the foregoing, the recirculated air is induced by the ejector action of the conditioned air. In the unit of Figs. 5 and 6 which will now be described, the recirculated air is drawn in by blower in the unit.

The blower wheel 60 which extends the length of the unit adjacent the lower grille 61 and the conditioned air supply duct 62, is rotated by the reversible motor 63. The wheel 60 when rotated in a clockwise direction with respect to Fig. 5 of the drawing, draws recirculated air through the grille 61, and discharges it with the conditioned air from the duct 62, through the passage 64 and over a heat exchanger 28 and out the upper grille 65.

When the blower wheel 60 is rotated in a counterclockwise direction with respect to Fig. 5, the recirculated air is drawn in through the upper grille 65 and over the heat exchanger 28, and discharged with the conditioned air from the duct 62, through the lower grille 61.

The unit of Figs. 5 and 6 while it contains a heat exchanger 28, a valve 41, a solenoid 42 and a bellows 26, does not contain a bellows 22 for adjusting ejector nozzles, but contains instead as illustrated by Fig. 8, a bellows 66 connected by the tube 67 to the bellows 26 and which serves to adjust the mechanism for reversing the motor 63 as will now be described.

When heating fluid is supplied to the heat exchanger in the unit, the expansion of the bellows 26 causes the bellows 66 to expand and to move by the plunger 68, the contact arms 69 and 70 against the contacts 71 and 72 as illustrated by Fig. 8. The power supply source 52 is connected by the wires 74 and 75 to the field winding 73 of the motor 63. The brushes 77 and 78 of the armature 76 are connected to the contacts 71 and 72, and when the contact arms 69 and 70 strike these contacts, the motor 63 revolves in a direction for causing the blower wheel 60 to draw recirculated air in through the upper grille 65 and to discharge the mixed air through the lower grille 61.

When cooling fluid is supplied to the heat exchanger in the unit, the contraction of the bellows 26 causes the bellows 66 to contract and to move the contact arms 69 and 70 against the contacts 79 and 80. This connects current of opposite polarity to the armature 76 in a conventional motor reversing circuit, causing the armature to revolve in the opposite direction for causing the blower wheel 60 to draw recirculated air in through the lower grille 61 and to discharge the mixed air through the upper grille 65.

The thermostat 40 acts to control the heat exchanger 28 in the unit of Figs. 5 and 6 as previously described in connection with Figs. 1–4 and Fig. 7.

Advantages of discharging the chilled air from the upper portion of the unit in the cooling season, and of discharging the heated air from the lower portion of the unit in the heating season are that natural convection currents are used for more uniform distribution and increased comfort. In the prior units in which the heated air was discharged from the upper portions of the units in the heating season, the ceiling space was overheated, and the floor space was under heated causing drafts.

An advantage of the unit of Figs. 1–4 is that no motor is used in the unit, the energy for moving the air being supplied by an air compressor at the central source of conditioned air.

An advantage of the unit of Figs. 5 and 6 is that the motor in the unit aids in overcoming the resistance to air flow of the duct connecting the central source and the unit. This type of unit is desirable where the unit is located a long distance from the conditioner, or where it is necessary to use a very small duct or pipe for supplying the conditioned air to the unit.

While embodiments of the invention have been described for the purpose of illustration, it should be understood that the invention is not limited to the exact apparatus and arrangements of apparatus illustrated, as modifications thereof may be suggested by those skilled in the art without departure from the essence of the invention.

What is claimed is:

1. An air distributing unit comprising a casing having upper and lower air openings therein, means for supplying conditioned air into said casing, a heat exchanger in said casing, means for supplying a heat exchange fluid into said exchanger, and means including means responsive to the temperature of said fluid for directing said conditioned air out the lower of said openings when the temperature of said fluid is at one point and for directing said conditioned air out the upper of said openings when the temperature of said fluid is at a point below said one point.

2. An air distributing unit comprising a casing having upper and lower air openings therein, means for supplying conditioned air into said casing, a heat exchanger in said casing, means for supplying a heat exchange fluid into said exchanger, air moving means in said casing, and means including means responsive to the temperature of said fluid for actuating said air moving means to draw in air from the space served by said unit through the upper of said openings into said casing and to discharge said conditioned air and said drawn in air from said casing through the lower of said openings when said fluid is at one temperature and for actuating said air moving means to draw in air from the space served by said unit through the lower of said openings into said casing and to discharge said conditioned air and said drawn air from said casing through the upper of said openings when the temperature of said fluid is below said one temperature.

3. An air distributing unit according to claim 2 in which said air moving means comprises air ejectors through which said conditioned air passes.

4. An air distributing unit according to claim 2 in which the air moving means comprises a blower wheel rotated by a reversable motor, and the temperature responsive means controls the direction of rotation of the motor.

5. An air distributing unit comprising a casing having an upper air opening and a lower air opening, a heat exchanger in said casing, means for supplying heat exchange fluid into said exchanger, a first ejector nozzle in said casing located to discharge air towards said upper opening, a second ejector nozzle in said casing located to discharge air towards said lower opening, means for directing conditioned air supplied from a central source of said nozzles, and means including means responsive to the temperature of said fluid for opening said first nozzle and closing said second nozzle at one fluid temperature and for closing said first nozzle and opening said second nozzle at another fluid temperature.

6. An air distributing unit comprising a casing having an upper and a lower air opening therein, a heat exchanger in said casing, means for supplying heat exchange fluid into said exchanger, air moving means in said casing, and means responsive to the temperature of said fluid for causing said moving means to draw air into said casing from the space served by said unit through said upper opening when said fluid is at one temperature, and to draw air into said casing from said space through said lower opening when said fluid is at another temperature below said one temperature.

7. An air distributing unit comprising a casing, a heat exchanger in said casing, means including a valve for supplying a heat exchange fluid into said exchanger, a solenoid for adjusting said valve, means for energizing said solenoid, and means including means responsive to the temperature of said fluid for causing said solenoid when energized to adjust said valve towards open position when said fluid is at one temperature and for causing said solenoid when energized to adjust said valve towards closed position when said fluid is at a temperature below said one temperature.

8. An air distributing unit comprising a casing, a heat exchanger in said casing, means for passing air over said exchanger and discharging it from said casing, means including a valve for supplying heat exchange fluid into said exchanger, a solenoid for adjusting said valve, means including means responsive to the temperature of the air discharged from said casing for energizing said solenoid, and means including meas responsive to the temperature of said fluid for causing said solenoid when energized to adjust said valve towards open position when said fluid is at one temperature and for causing said solenoid when energized to adjust said valve towards closed position when said fluid is at a temperature below said one temperature.

9. An air distributing unit comprising a casing, a heat exchanger in said casing, means for passing air over said exchanger and for discharging it from said casing, means including a valve for supplying heat exchange fluid into said exchanger, electric means for adjusting said valve, and means including means responsive to the temperature of the air discharged from said casing and including means responsive to the temperature of said fluid for causing said electric means to adjust said valve towards open postion when the temperature of said fluid is above one temperature and the air discharged from said casing is below a selected temperature, and for causing said electric means to adjust said valve towards closed position when the temperature of said fluid is at a temperature below said one temperature and the air discharged from said casing is below a selected temperature.

10. An air distributing unit comprising a casing having an upper air opening and a lower air opening, means for supplying conditioned air into said casing, a heat exchanger in said casing, means including a valve for supplying heat exchange fluid into said exchanger, electric means for adjusting said valve, means including means responsive to the temperature of said fluid for directing said conditioned air out said upper opening or out said lower opening, and means responsive to the temperature of said fluid and including means responsive to the temperature of the air discharged from said casing for actuating said electric means to adjust said valve towards open position or towards closed position.

11. An air distributing unit comprising a casing having an upper air opening and a lower air opening, means for supplying conditioned air into said casing, a heat exchanger in said casing, means including a valve for supplying heat exchange fluid into said exchanger, valve adjusting means, means including means responsive to the temperature of said fluid for discharging said conditioned air from said casing through said upper opening or said lower opening, and means including means responsive to the temperature of the air discharged from said casing and including means responsive to the temperature of said fluid for actuating said adjusting means to adjust said valve towards open position or towards closed position.

12. An air distributing unit comprising a casing having an upper air opening and a lower air opening, air moving means in said casing, means for supplying conditioned air into said air moving means, a heat exchanger in said casing, means including a valve for supplying heat exchange fluid into said exchanger, means for adjusting said valve, means including means responsive to the temperature of said fluid for actuating said air moving means to draw air from the space served by said unit into said casing through said upper opening and to discharge same with said conditioned air through said lower opening, or to draw air from said space into said casing through said lower opening and to discharge same with said conditioned air through said upper opening, and means including means responsive to the temperature of said fluid and including means responsive to the temperature of the air discharged from said casing for causing said adjusting means to adjust said valve towards closed positon or towards open position.

13. An air distributing unit comprising a casing having an upper air openinng and a lower air opening, ejector nozzles in said casing directed to discharge air towards said upper opening, other ejector nozzles in said casing directed to discharge air towards said lower opening, means for supplying conditioned air into said casing and to said nozzles, a heat exchanger in said casing, means including a valve for supplying heat exchange fluid into said exchanger, means for adjusting said valve, means including means responsive to the temperature of said fluid for opening said first mentioned nozzles and closing said other nozzles or for closing said first mentioned nozzles and opening said other nozzles, and means responsive to the temperature of said fluid and including means responsive to the temperature of the air discharged from said casing through said openings for causing said adjusting means to adjust said valve towards open or towards closed position.

14. An air distributing unit comprising a casing having an upper air opening and a lower air opening, a blower wheel in said casing, a motor for rotating said wheel, a heat exchanger in said casing, means including a valve for supplying heat exchange fluid into said exchanger, means for adjusting said valve, means including means responsive to the temperature of said fluid for causing said motor to rotate said wheel in one direction to discharge air from said casing through said upper opening and for causing said motor to rotate said wheel in the opposite direction to discharge air from said casing through said lower opening, and means including means responsive to the temperature of said fluid and including means responsive to the temperature of the air discharged from said casing for causing said adjusting means to adjust said valve towards closed position or towards open position.

HENRY R. SEWELL.
ROBERT T. PALMER.

REFERENCES CITED

The following references are of record in the file of this patent:

UNITED STATES PATENTS

| Number | Name | Date |
|--------|------|------|
| 863,211 | Paul | Aug. 13, 1907 |
| 2,000,597 | Keyes | May 7, 1935 |
| 2,139,262 | Euwer | Dec. 6, 1938 |